United States Patent [19]
Dash et al.

[11] Patent Number: 5,526,574
[45] Date of Patent: Jun. 18, 1996

[54] DEVICE AND METHOD FOR LOCATING ASTRONOMICAL OBJECTS

[76] Inventors: Glen R. Dash; Becky Dash, both of 968 Lowell Rd., Concord, Mass. 01742

[21] Appl. No.: 203,441

[22] Filed: Feb. 28, 1994

[51] Int. Cl.$^6$ ........................................................ F41G 1/32
[52] U.S. Cl. ............................... 33/228; 33/1 CC; 33/241
[58] Field of Search ........................... 362/102, 109; 33/241, 1 CC, 228

[56] References Cited

U.S. PATENT DOCUMENTS

| | | | |
|---|---|---|---|
| 1,574,623 | 2/1926 | Grau | 362/102 |
| 2,108,802 | 2/1938 | Dorsey | 362/102 |
| 3,678,590 | 7/1972 | Hayward | 362/32 |
| 3,833,799 | 9/1974 | Audet | 33/241 |
| 4,226,163 | 10/1980 | Welcomer | 362/102 |
| 4,702,703 | 10/1987 | Herbst | 434/289 |
| 4,970,793 | 11/1990 | Atamian | 33/268 |
| 5,003,437 | 3/1991 | Barrett | 362/102 |
| 5,036,442 | 7/1991 | Brown | 362/102 |

Primary Examiner—Carroll B. Dority

[57] ABSTRACT

A method for use by a teacher (38) to illustrate the location of a star (41) or other celestial object which consists of a rod (12) which is illuminated with a red light (14) at its far end. The rod is placed on the shoulder of a student (40) and pointed by the teacher at the object. The student, by sighting down the rod, will be able to observe the object the teacher is referring to without having any knowledge of astronomical coordinate systems or using star charts.

2 Claims, 6 Drawing Sheets

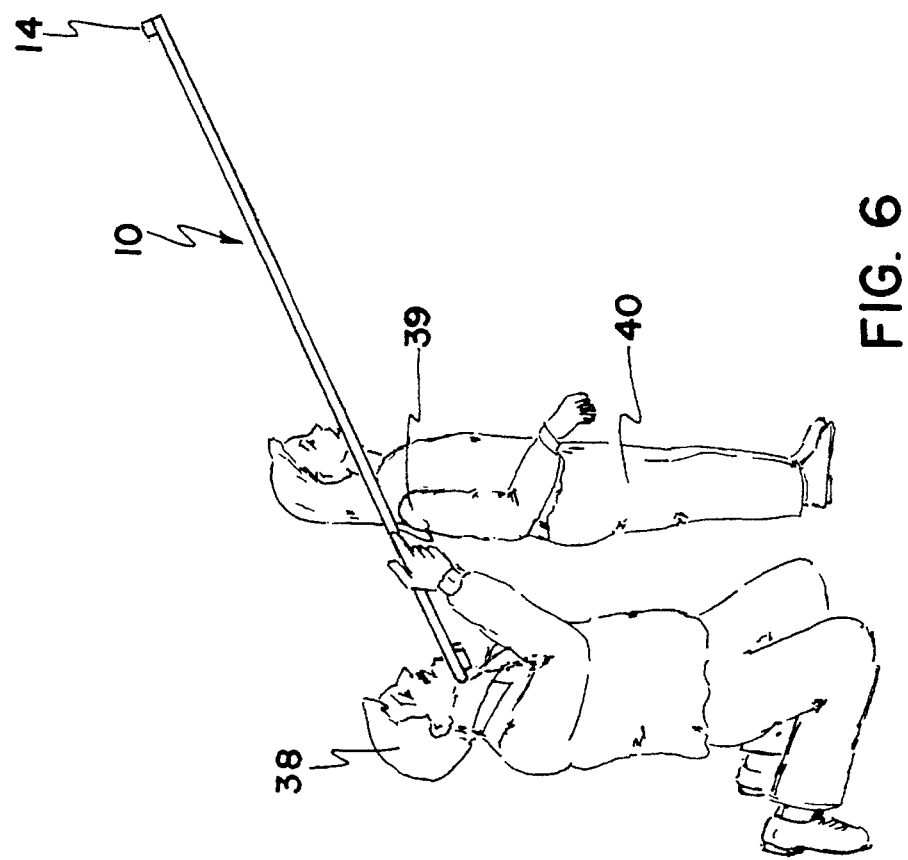

DEVICE AND METHOD FOR LOCATING ASTRONOMICAL OBJECTS

BACKGROUND

1. Field of Invention

This invention relates to a device for locating a distant object and communicating its position to another person, or more particularly a device which permits one person to locate a celestial object and to illustrate its position to another person.

2. Discussion of the Prior Art

For centuries people have viewed the heavens at night and sought to point out stars, planets and other astronomical objects to others. The process, though, can be most difficult. There are thousands of objects in the night sky and most are just points of light which, except for subtle differences in color, are identical. The night sky lacks any accessible coordinate system, eliminating any possibility of readily describing an object in terms of its declination or right ascension, as longitude and latitude in the night sky are conventionally described. Objects like stars are distributed at random, the constellations they form only identifiable to the trained eye and even that with some imagination. For these reasons, describing the location of an object in the night sky can be most frustrating, especially when teaching children.

Star charts have been used for decades as an aid to locating objects. These charts consist of a map of the sky. By looking at the chart, and then the sky, usually several times, the viewer can gradually become accustomed to patterns in the stars and will be able to locate one object relative to another. One viewer, wishing to point out an object to another, can point it out on the star chart. The second viewer can then locate it in the sky by locating the object among the pattern of the stars.

The method described above is most readily suited to experienced observers. Novice observers have difficulty orienting themselves so they can relate the star chart to what they see in the sky. Further confusion is caused by the earth's rotation and its movement around the sun. This causes the applicable chart to change from night to night and hour to hour. Further, most charts, to be useful, must be oriented with respect to map coordinates and novices can have difficulty in locating the northern star, Polaris, an essential part of the process. In addition, such charts, to be read, must be lit, yet lighting can cause the eye to dilate, reducing visual sensitivity. Charts are subject to being blown around by the wind and soaking up moisture from sources such as dew. Finally, such charts, being flat, distort the position of the stars which appear to the observer as if they were arrayed on a celestial sphere.

Astronomers can make use of sophisticated instruments based on the coordinate system consisting of declination and right ascension. This permits an astronomer to locate objects and to communicate their position with precision. However, few outside the community of professions and serious amateur observers can master the complex system or work the tools necessary to utilize it, tools which include clock driven motors in most cases. Such tools are not generally available to casual observers, can be expensive, and are not easily understood by children.

The ultimate tool for locating objects are computerized, motor driven telescopes, which are now available to the general public. With a touch of a few buttons, the telescope swings to a position which permits any given star, planet, cluster or other astronomical object to be viewed in the eye piece. However, these telescopes are expensive, delicate and sometimes heavy. They can be difficult to set up, especially with regard to polar and right ascension alignment. Children, and some adults, have difficulty viewing through eye pieces, which, in any case, restrict the field of view.

Most recently, the use of lasers as pointing devices has been proposed. These lasers are pointed toward the object in the sky to be illustrated. The other viewers look up in the sky and see the laser beam extending toward the object. However, the relatively high power laser beams usable for such purposes can be unsafe for use by the untrained or around children. The high power needed to sustain the laser requires power supplies with large energy capacities which limits the usefulness of batteries, makes the lasers heavy and may limit such devices to the range that can be achieved with a power cord. Such high power lasers are not readily accessible to the general public, and when available are expensive. Further, the beam itself is not visible. The system works by reflecting the laser beam off dust in the atmosphere. Such dust is not always present in sufficient quantity to yield a usable display of the laser beam. Indeed, the best times for viewing are the nights when the sky is relatively free of dust and at these times the laser beam system may not function well. Further, the light of some laser beams may alter the night visual sensitivity of some viewers.

Atamian (U.S. Pat. No. 4,970,793, Nov. 20, 1990) describes a method for locating celestial objects utilizing a transparent hollow globe with phosphorescent indicia to indicate the location of stars. The method requires the following steps. First a "sun position table" is consulted to locate the position of the sun in the sky relative to the background of stars. Then a removable "sun sticker" is applied to the globe at that location. The globe is then rotated to align its horizon with the latitude of the observer's horizon. A second chart or reference source may be needed to identify the observer's latitude. A knob is then turned to align a horizontally positioned ring with the "sun sticker". These steps being completed, the globe is then illuminated with light to make the indicia glow. For a few moments, the indicia will be visible. For those moments, a single observer may align, through juxtaposition, the globe with the night sky to identify objects.

The method proposed by Atamian is complex. It involves two reference charts and careful alignment of the apparatus using the data obtained from two charts. Further, to function, it requires bright light which can reduce the viewer's night vision. Further, the globe can only be used by one observer at a time. Only one observer is aligned so that juxtaposition can be achieved. A second observer, viewing the same indicia at the same time will not be aligned due to the effect of parallax.

OBJECTS AND ADVANTAGES

Accordingly, the objects and advantages of this invention are (a) to provide for a device which can be used to illustrate objects in the night sky, (b) to provide a method of using such a device which does not rely on a map, coordinate system, mathematical computation nor require polar alignment, (c) to make such a device suitable for use by children, in that it employs electrical systems that are inherently safe and does not utilize potentially hazardous sources of radiation such as lasers, (d) to provide for such a device in a form which is portable and substantially immune to effects of environmental conditions such as wind, cold, moisture or the presence of atmospheric dust, (e) to provide for such a device in a form which is relatively inexpensive and which is rugged enough to be used by and around children, (f) to provide for such a device in a form which does not significantly restrict the visual field, (g) to provide for such a device in a form which can be used by a plurality of viewers simultaneously by limiting the effects of parallax, and (h) to provide for a means to illuminate the position of an object in the sky which will not substantially affect the viewer's night vision.

Further objects and advantages of this invention will become apparent from the consideration of the drawings and ensuing description.

BRIEF DESCRIPTION OF THE DRAWINGS

FIG. 6 is a perspective view of the device of FIG. 1 in use.

Figure 1:
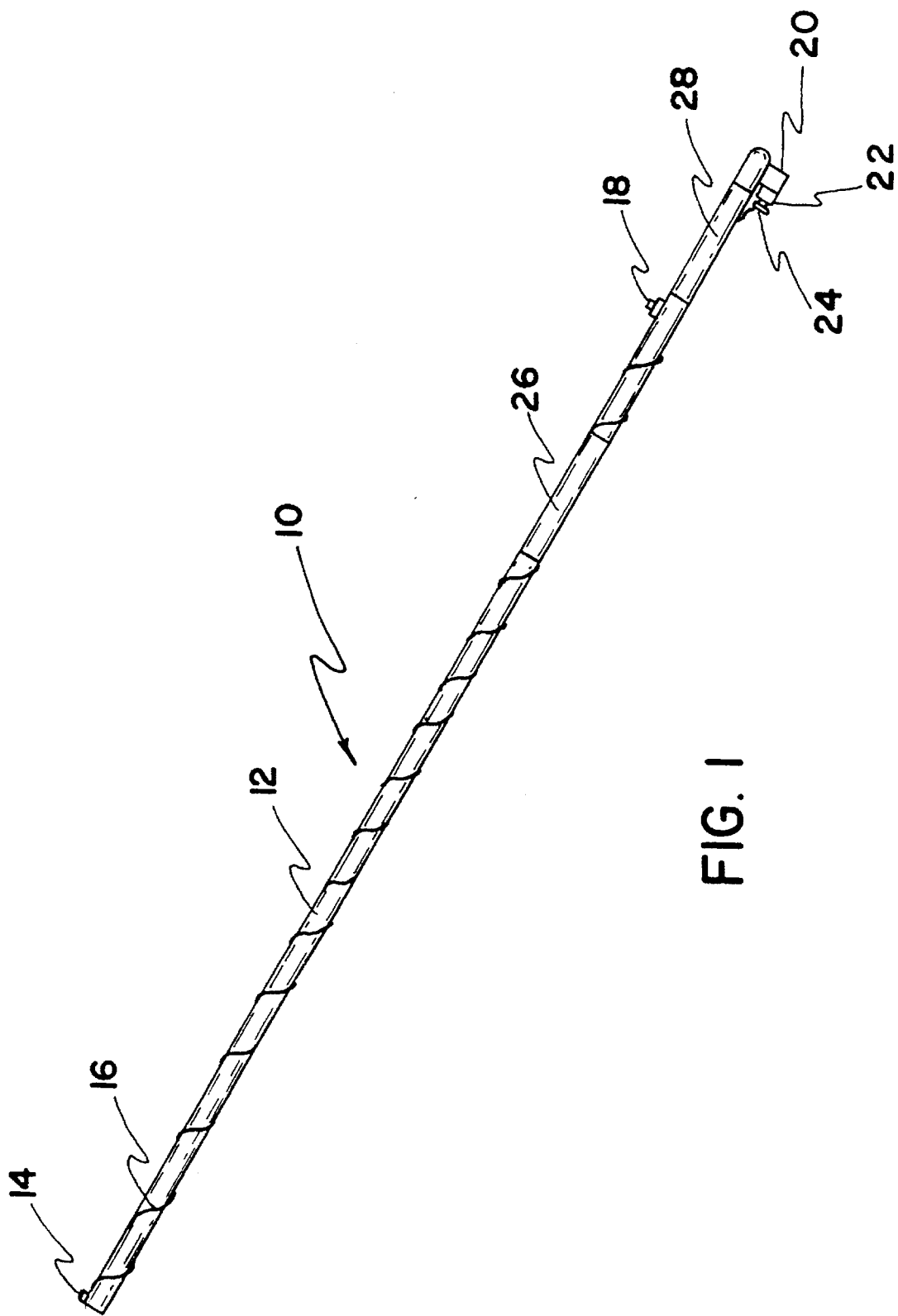
FIG. 1 is a perspective view of the inventive device.

| List of Reference Numerals | |
|---|---|
| 10 | Inventive Device |
| 12 | Rod |
| 14 | Light |
| 16 | Wire Pair |
| 18 | Switch |
| 20 | Battery Holder |
| 22 | Battery |
| 24 | Battery Clip |
| 26 | Grip |
| 28 | Grip |
| 30 | Resistor |
| 32 | Wire Tie |
| 34 | Wire Tie |
| 36 | Wire Tie |
| 38 | Teacher |
| 39 | Student's Shoulder |
| 40 | Student |
| 41 | Star |
| 42 | Star |
| 44 | Star |
| 46 | Star |
| 48 | Star |
| 50 | Star |

SUMMARY OF INVENTION

The present invention provides a pointer which can be used by a first person to illustrate the location of a celestial object to another. The pointer has a light on its far end which can be illuminated. To use the pointer, a first person, the teacher, points it at the celestial object to be illustrated and activates the light. The second person, the student, sights down the pointer locating the object. The effect of parallax can be limited by the length of the pointer and the orientation of the teacher and student.

DETAILED DESCRIPTION—FIG. 1 TO FIG. 7

FIG. 1 shows an inventive device 10 including an elongated member, pole, pointer, stick, staff, baton or rod 12. Positioned at one end of rod 12 is a bulb, luminary, lantern or light 14. Light 14 is connected through a resistor (not shown) to a wire pair 16 which is wound spirally around rod 12. Wire pair 16 leads to a switch 18 which, in turn, connects to a battery 22 through a battery connector 24. Battery 22 is held in a holder 20. Two grips 26 and 28 are provided.

Figure 2:
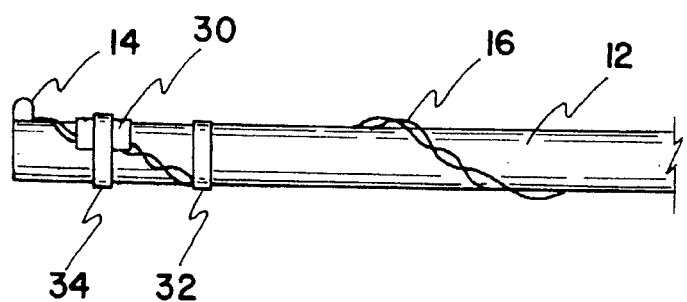
FIG. 2 is a perspective view of a portion of the device of FIG. 1.

FIG. 2 shows one end of inventive device 10. This end contains light 14 connected through a resistor 30 to wire pair 16. Resistor 30 and wire pair 16 are held in place with a pair of wire ties 32, 34.

Figure 3:
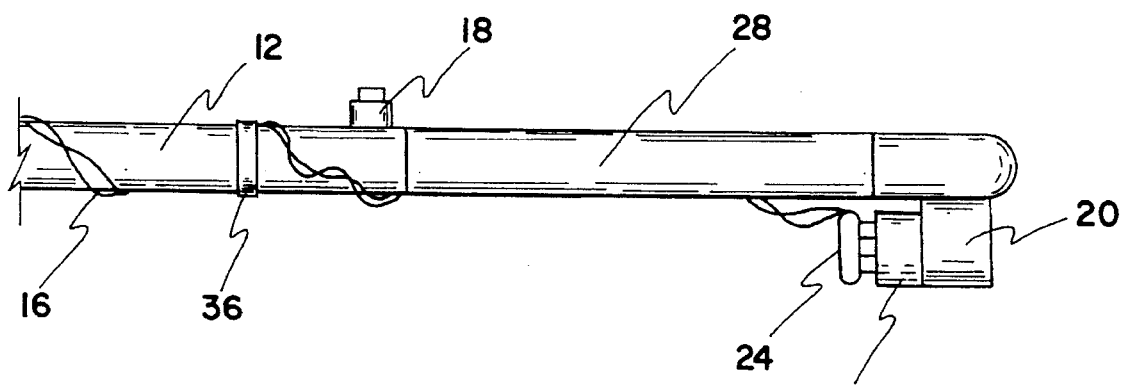
FIG. 3 is a perspective view of a portion of the device of FIG. 1.

FIG. 3 shows the other end of inventive device 10 from that illustrated in FIG. 2. Shown is wire pair 16 leading to switch 18 which interrupts current from battery 22. Battery 22 is held in holder 20 and is connected to wise pair 16 through a connector 24. Grip 28 provides a place for holding rod 12.

Rod 12 could be hollow or solid. It could be comprised of any material of a suitable strength including wood, fiberglass, plastic or metal but must be sufficiently stiff so that it does not noticeably bend when lifted. It could be made of one continuous piece or could be assembled from sections or be made telescopic or foldable.

Light 14 could be an incandescent light bulb, neon bulb, fluorescent light, light emitting diode, other electronically stimulated light source or be of phosphorescent indicia. If electronically stimulated, it could be lit for the duration of the current flow or could flash intermittently. It could be placed on the outside of rod 12 as shown or inside a sight. If rod 12 was made hollow, the light could be sited inside rod 12.

Resistor 30 limits the current flow through light 14. For light emitting diodes this current flow should be within the range of 100 microamps to 50 milliamps. Resistor 30 is not needed if light 14 is of the incandescent variety.

Wire pair 16 is shown spiral wrapped around rod 12 and held in place with wire ties 32, 34. Alternately, wire pair 16 can be placed in a channel in rod 12 or, if rod 12 is made hollow, through the hollow core of rod 12.

Switch 18 is of a conventional, momentary single pole, single throw momentary-on type. Other switch types including rocker, throw, push on push off or membrane types could be used.

Battery 22 is illustrated as a conventional 9 volt type. Other battery types could be utilized including A, AA, AAA, C or D types, carbon, zinc, alkaline or rechargeable. For operation of a LED as light 14 a voltage greater than the forward voltage drop of the LED (1.4 to 1.8 volts generally) must be applied. Battery 18 could be housed in a plastic assembly with a fixed or a removable cover of conventional type.

Grips 26, 28 provide a surface for holding inventive device 10 and could be made of materials such as leather, rubber or heat shrinkable tubing. Alternately, grips form to fit the hand or pistol type grips could be used.

Figure 4:
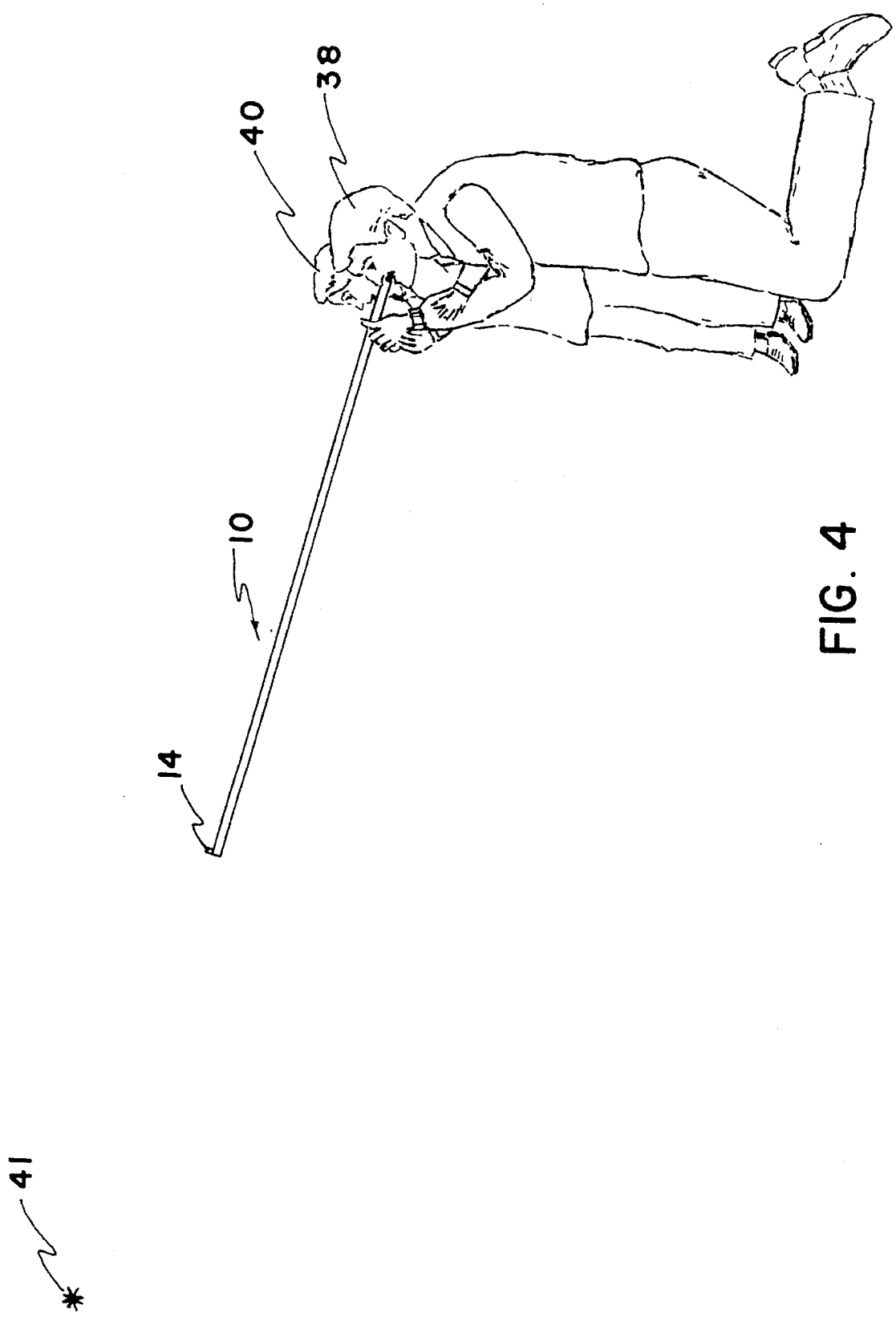
FIG. 4 is a perspective of the device of FIG. 1 in use.

FIG. 4 shows a first person, first viewer or teacher 38 holding inventive device 10. His left hand is placed over grip 26, his right hand (not shown) is wrapped around grip 28 with his thumb placed on top of switch 18. Standing next to teacher 38 is a second person, viewer or student 40. To provide comfort and stability, student 40 is holding on to teacher 38. By holding grips 26 and 28, teacher 38 can point inventive device 10 at a distant star 41. By pressing switch 18, teacher 38 can illustrate to student 40 the star he wishes to talk about. Pressing switch 18 illuminates light 14.

Figure 5A:
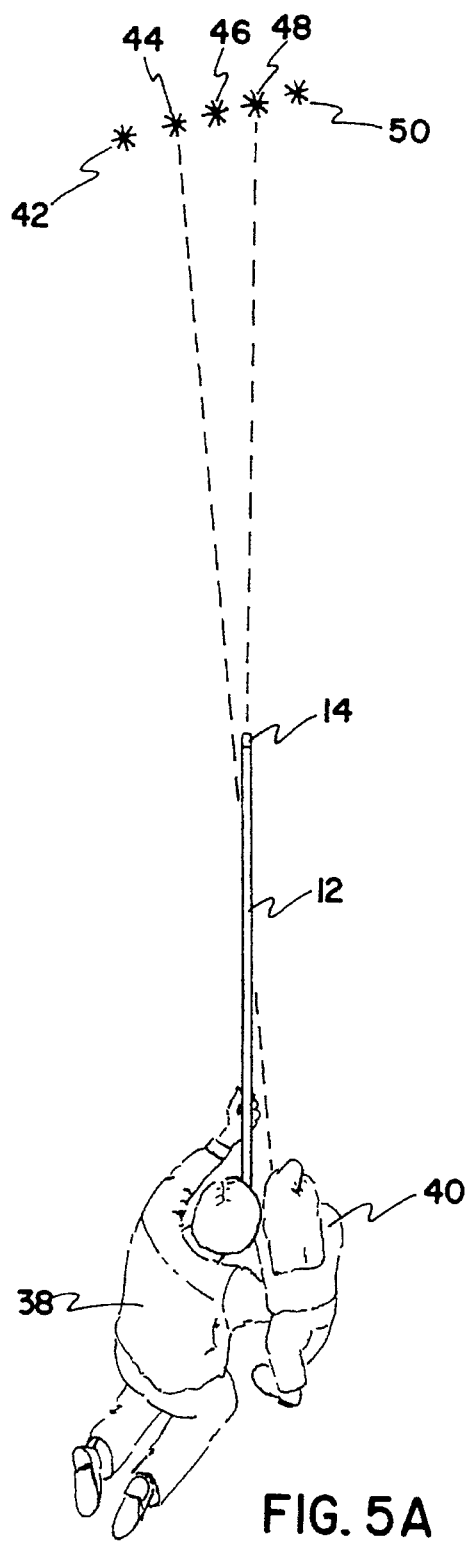
FIG. 5a is a top perspective view of the device of FIG. 1 in use illustrating the effect of parallax.
Figure 5B:
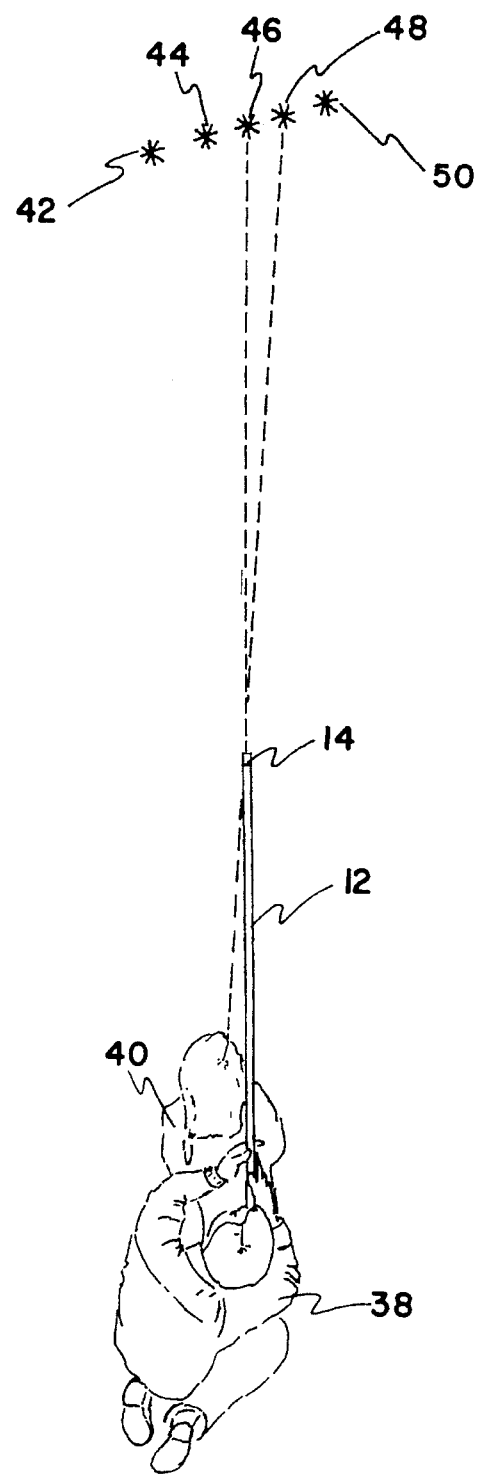
FIG. 5b is a top perspective view of the device of FIG. 1 in use illustrating a method of reducing the effect of parallax.

FIG. 5a is a top perspective view of the use of inventive device 10. Here, teacher 38 and student 40 are displaced to either side of the inventive device 10. Wire pair 16 carries current from battery 22 (not shown) through switch 18 (not shown) through resistor (not shown) to light 14. A distance of approximately 8 cm separates student 40 from the inventive device 10. This separation causes an effect illustrated in FIG. 5a known as a parallax. When sighting from his position through light 14, teacher 38 sees star 48. At the same time student 40 sighting through light 14 sees star 44. The effect of parallax makes student 40 think that teacher 38 is referring to star 44 rather than star 48. The parallax error can be computed by methods well known to those skilled in the art and for the length of rod and relative position of the persons in FIG. 5a is approximately 5 degrees. FIG. 5b shows one method of reducing this parallax. Here inventive device 10 is placed on the shoulder of student 40. This arrangement allows the student's eye to be relatively closer to inventive device 10, reducing parallax. The parallax illustrated is approximately 3 degrees. Placing inventive device 10 on the shoulder of student 40 also provides for mechanical stability.

FIG. 6 shows a perspective side view of the method for reducing parallax illustrated in FIG. 5b. Teacher 38 kneels behind student 40 and places inventive device 10 on shoulder 39 of student 40. Teacher 38 sights through light 14 to star 41. Since the head of teacher 38 and student 40 are now behind each other, parallax errors are minimized. Further, the longer rod 12, the less the parallax error. As a practical matter, if rod 12 is made 1.85 meters or more in length, the parallax error of two viewers positioned as shown in FIG. 6 will be small enough to permit practical usage.

Alternately, inventive device 10 could be placed on a different part of the body of student 40, including on top of the head or under the arm. Further, inventive device 10 could be placed on a tripod or other mechanical support. Other techniques for providing mechanical support are well known in the art and could be utilized without affecting the novelty of the invention.

Figure 7:
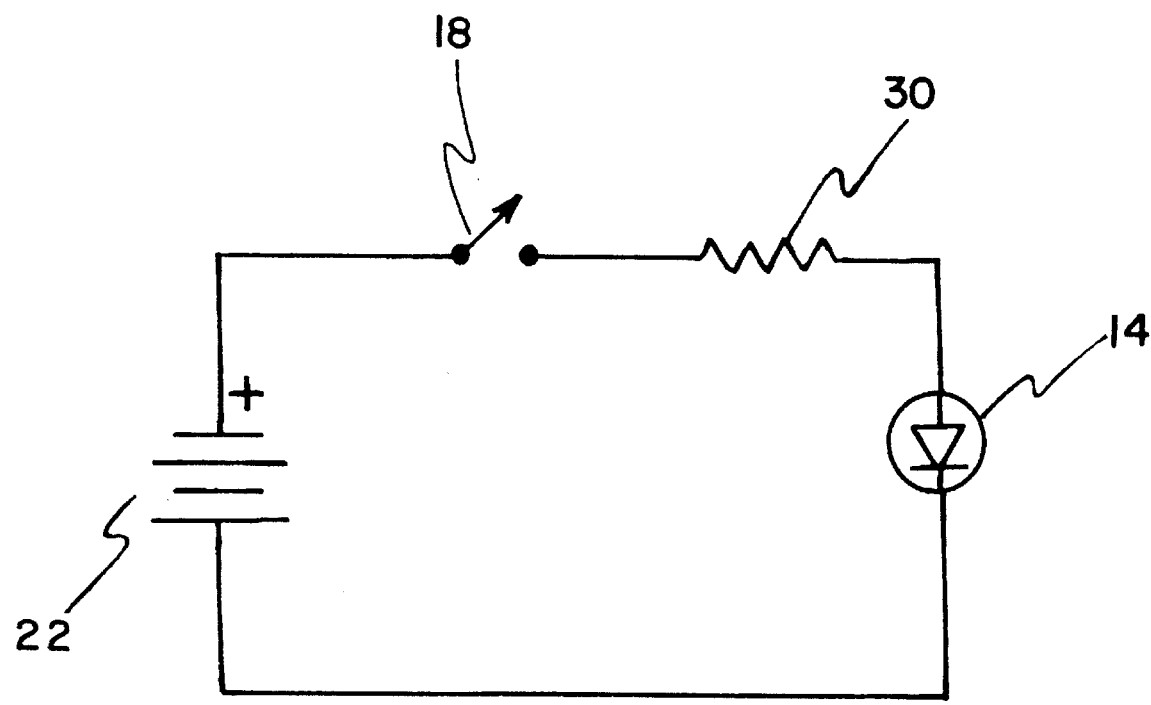
FIG. 7 shows an electrical schematic for a light used in the device.

FIG. 7 shows an electrical schematic consisting of battery 22, switch 18, resistor 30 and light 14. In this embodiment, light 14 is in the form of a light emitting diode. In its preferred embodiment, radiant energy emitted from light 14 should be toward the longer wavelengths of the visual spectrum, generally greater than 600 nanometers. These colors, orange and red in particular, do not impair night vision as readily as radiant energy in the center or to the shorter wavelengths of the visual spectrum.

SUMMARY RAMIFICATIONS AND SCOPE

Thus the reader will see that this invention provides for a mechanism for a teacher to illustrate objects to students in the night sky. The method does not rely on star maps which can blow in the wind, gather moisture and which must be illuminated to be read. Objects can be directly located in the sky without referencing back and forth between a star map and the sky itself. Students of any age can quickly locate the object being illustrated without any prior knowledge of a coordinate system. The inventive device utilized as shown employs electrical systems that are battery powered and are therefore inherently safe. It permits objects in the night sky to be illustrated but avoids lights of intensity or frequency that can affect night vision or which are potentially harmful. The inventive device is portable and does not need the presence of atmospheric dust to operate. Relative to other devices such as telescopes, the inventive device is rugged and inexpensive enough to be used by and around children. Further, by using the inventive device, the student and teacher maintain their entire visual field. They are not restricted to the visual field which can be seen through a sight or an eyepiece. When made of sufficient length, the effect of parallax can be minimized.

While the above description contains many specificities, these should not be construed as limitations on the scope of the invention, but rather as an exemplification of one preferred embodiment thereof. Many other variations are possible. For example, the device could be used to point out, not stars, but any distant object, whether fixed or in motion. It could be used with one or with a multiplicity of students. A multiplicity of inventive devices could be ganged together to teach a multiplicity of students at the same time. Accordingly, the scope of the invention should be determined, not by the embodiment illustrated, but by the appended claims and their legal equivalents.

We claim:

1. A method for use by a first person to illustrate the position of an astronomical object to a second person comprising (a) said first person facing in a direction of an astronomical object, then (b) said second person positioning self in front of said first person facing substantially in said direction, then (c) said first person placing an elongated member of a length greater than 1.85 meters to reduce parallax to less than three degrees on a shoulder of said second person so as to permit a greater portion of said elongated member to project beyond said second person in said direction, then (d) said first person pointing said elongated member at said astronomical object, then (e) illuminating an end of said elongated member closest to said astronomical object with a light emitting diode through which a predetermined electrical current of approximately 100 microamps is passed so as to produce visible light predominately of wavelengths greater than 600 nanometers thereby creating an illuminated end, then (f) said second person sighting down said elongated member towards said illuminated end and hence toward said astronomical object, whereby said astronomical object may be located.

2. Method of claim 1 wherein said electrical current is selectively interrupted by a switching means.

* * * * *